United States Patent [19]

Nielson

[11] Patent Number: 4,829,911
[45] Date of Patent: May 16, 1989

[54] POLLUTION-FREE, RESOURCE RECOVERY, GARBAGE DISPOSAL/FUEL BURNING PLANT

[76] Inventor: Jay P. Nielson, 3490 Monte Verde Dr., Salt Lake City, Utah 84109

[21] Appl. No.: 229,237

[22] Filed: Aug. 8, 1988

[51] Int. Cl.$^4$ ............................................... F23B 7/00
[52] U.S. Cl. ................................. 110/234; 110/108; 110/203; 110/216; 110/229; 110/242; 110/244; 110/259; 110/346; 48/190
[58] Field of Search ............... 110/259, 346, 242, 246, 110/229, 203, 216, 234, 108; 48/190, 210

[56] References Cited

U.S. PATENT DOCUMENTS

| | | | |
|---|---|---|---|
| 4,437,419 | 2/1984 | Hertel | 110/259 |
| 4,665,841 | 5/1987 | Kish | 110/234 |
| 4,728,341 | 1/1988 | Nielson | 48/190 |
| 4,732,091 | 3/1988 | Gould | 110/229 |
| 4,734,166 | 3/1988 | Angelo, II | 110/246 X |

*Primary Examiner*—Edward G. Favors
*Attorney, Agent, or Firm*—Philip A. Mallinckrodt; Robert R. Mallinckrodt

[57] ABSTRACT

The invention is a method and apparatus for burning combustibles, particularly garbage and coal, in such a manner as to prevent the venting of unwanted pollutants into the atmosphere and for recovering valuable resources. The combustibles are burned in a rotating inclined furnace; solids and molten metals are extracted at the discharge end of the furnace; the discharged gases are passed through a boiler for extracting heat therefrom and generating steam; the discharged gases are liquefied by sequential cooling and the so-liquefied products removed while preventing discharge of gases into the atmosphere; the remaining gases are passed through a second boiler for further extraction of heat and steam generation and further extraction of liquefied products; and the effluent gases are passed into subsequent apparatus for removing any remaining pollutants and for the recovering of resources in accordance with Nielson U.S. Pat. No. 4,728,341.

34 Claims, 4 Drawing Sheets

POLLUTION-FREE, RESOURCE RECOVERY, GARBAGE DISPOSAL/FUEL BURNING PLANT

BACKGROUND OF THE INVENTION

Field:

The invention is in the field of solid fuel burning and burners therefor, especially for the disposal of waste materials, such as garbage, while deriving heat energy, and recovering valuable resources, therefrom.

State of the Art:

Disposal of garbage is a problem of growing concern and frustration in the world today. In the United States alone people throw out more than 400,000 tons of refuse per day. Landfills are rapidly becoming exhausted and new ones not available in many communities. As an example, Oyster Bay and Huntington, on Long Island, N.Y., pay high prices to have their garbage hauled to a landfill in Pennsylvania. Some other communities have even resorted to having their garbage hauled as far away as Africa.

Many communities have resorted to burning their garbage. There are in excess of 120 garbage burning plants in the United States today with some 600 more planned or in construction. It is estimated that by the end of 1988 more than 60,000 tons of waste will be burned every day in the U.S.

However, burning or incineration of garbage presents many serious problems. Perhaps the most acute is the inevitable venting of pollutants from the stack into the atmosphere by all existing plants. Such venting of pollutants has been minimized, at great expense, by the use of scrubbers, filters, and electrostatic precipitators. However, such devices are only partially effective. Clean air standards are frequently exceeded. Monitoring is a constant necessity. Plants are sometimes required to shut down for hours or days at a time, many even permanently.

Another severe problem is the disposal of toxic ash generated in the plant. On the average 350 tons of ash is generated for every 1000 tons of refuse burned. n a volume basis a pint of ash results from a gallon of garbage. This ash is normally buried in landfills but, since it is toxic, environmentalists are greatly concerned about its leaching into the groundwater.

These problems are so severe that many communities prohibit the use of garbage burning plants. In addition, environmentalists are becoming very active in preventing the construction of such plants.

Coal, oil, and other solids fuel burning plants have many of the same problems. Acid rain resulting from pollutants being emitted from such plants, has received much notoriety of late, with no solution apparently in sight. As an example. California has prohibited the construction of any plants that burn coal to produce electricity. Consequently, a huge new power plant has been recently built in Utah to burn coal to produce electricity intended primarily for consumption of California, with the attendant high cost and energy loss in transit.

The major pollutants of concern are cadmium, lead, copper, mercury, manganese, selenium, nickel, beryllium, chromium, zinc, arsenic, arsenic disulfide, oxides of sulfur ($SO_x$), oxides of nitrogen ($NO_x$), oxides of carbon ($CO_x$), hydrocarbons ($HC_x$), acid gases, chlorides, dioxins, mercaptans, and particulates. Some of these are discharged from the burner as bottom ash, and some from the stack as fly ash or gaseous effluents. These pollutants are becoming increasingly severe due to increasing amounts of plastics in garbage.

Pertinent reference articles are found in the National Geographic for Apr., 1987, pages 502-537 entitled "An Atmosphere of Uncertainty," and in U.S. News and World Report for July 25, 1988, pages 43-45, entitled "Yes, They Mind if we Smoke."

Objectives:

Principal objects in the making of the present invention were to develop method and apparatus for burning solid combustibles, especially disposable wastes, such as garbage, which permit the recovery of valuable resources, prevent the venting of polluting effluents into the atmosphere, and substantially prevent the generation of toxic waste, while utilizing the heat so generated for the production of steam or electricity or for other practical use; to reclaim the metals, salts, acids, and other useful materials that may be initially contained in the combustibles or that may be generated by the process, typically sulfuric acid ($H_2SO_4$), nitric acid ($HNO_3$), and frozen carbon dioxide ($CO_2$); to provide a fuel burning plant that can utilize lignite or coal of any rank as the fuel; and to provide a garbage disposal plant that can be operated in or near the heart of a city without creating environmental problems thus minimizing truck haulage over long distances.

SUMMARY OF THE INVENTION

The invention is a method and apparatus for burning coal, garbage, oil, or other solid combustibles, so as to prevent the release of pollutants to the atmosphere, and to recover valuable resources from the combustibles, including heat energy.

The combustibles are burned in a furnace sealed to the atmosphere in which time, temperature, and turbulence are controlled. Oxygen in excess of that needed for stoichiometric combustion is added. Solids and molten liquids discharged from the furnace are recovered as resources. Gases discharged from the furnace are passed through one or more heat exchangers wherein heat is extracted for the production of steam. Liquefied gases are recovered as resources. The effluent gases are then passed through a pipeline wherein the gases are sequentially cooled by refrigerants in heat exchange relationship with the pipeline. A the gases liquefy or solidify due to the cooling, they are successively recovered from the pipeline. Particulates are also removed. A a result, virtually noting is vented to the atmosphere, except nitrogen.

THE DRAWINGS

In the accompanying drawings, which show what is presently contemplated as the best way to carrying out the invention in actual practice.

DETAILED DESCRIPTION OF THE ILLUSTRATED EMBODIMENT

A typical application of the invention in the burning of garbage, coal, oil, or other solid combustible, utilizes the heat created by such combustion for generating steam that may in turn be used for the generation of electricity, and separates and recovers various materials and substances that may be initially contained in the combustible, or that may be created in the processing, all without venting pollutants into the atmosphere.

The particular embodiment shown and described herein is concerned with the burning of garbage mixed with coal, although any other solid combustible may be employed with only minor differences in the process and apparatus.

Figures 1, 2:
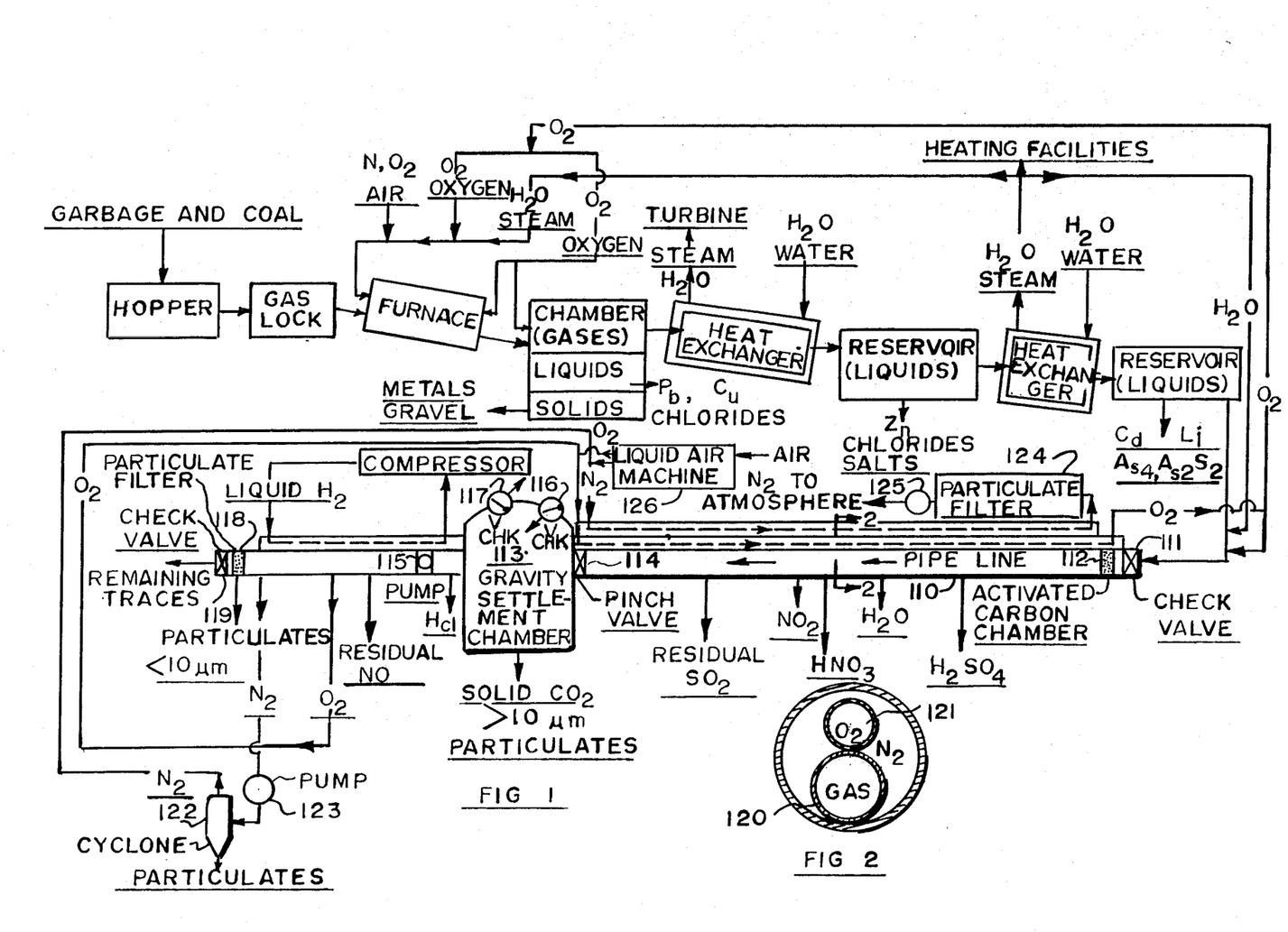
FIG. 1 is a flow sheet illustrating the method or process for burning combustibles and extracting valuable resources therefrom, while at the same time preventing the release of unwanted pollutants into the atmosphere, indicating the several stages conducted in combustible feed, the furnace, the heat exchangers, and the pipeline.
FIG. 2, a cross section of the pipeline as taken on line 2—2 of FIG. 1.

As indicated in the schematic diagram of FIG. 1, the combustibles are fed into a hopper, from whence they pass into a furnace by way of a gas-lock, thus preventing the escape of hot gases from the furnace into the atmosphere.

Air and substantial quantities of oxygen in excess of that needed for stoichiometric combustion are also introduced into the furnace. In addition, water vapor (steam) may be introduced as an aid in controlling the temperature inside the furnace. Such temperature is also controlled by the rate of feed of the oxygen, the air, and the combustibles. Pressure is also controlled, in the furnace and throughout the entire system, being brought to such a level as to overcome the gas friction head losses and to minimize the gas volume and pipe diameters.

The furnace is a cylindrical, inclined, rotating structure. The degree of incline and the speed of rotation are preferably adjustable, such as to permit the combustibles to remain in the furnace for a desired length of time. Rotation provides turbulence. Thus, the three vital parameters for optimally effecting combution, namely, time, temperature, and turbulence, are controlled. The temperature is maintained at approximately 2100° F. At this temperature, many potential pollutants are decomposed, such as hydrocarbons, the dioxins, the mercaptans, and others.

The products discharged from the furnace enter a separation-collection chamber. The solids, such as aluminum (Al), oxides of aluminum ($Al_2O_3$), beryllium (Be), Nickel (Ni), chromium (Cr), cobalt (Co), tin (Sn), iron (Fe), silver (Ag), titanium (Ti), manganese (Mn), steel, gravel, and perhaps others, fall to the bottom, from whence they are removed for recovery.

Molten substances, such as lead (Pb), copper (Cu), most chlorides, and perhaps others, collect and stratify above the solids, from whence they are removed and recovered.

Gaseous substances, such as oxygen ($O_2$), nitrogen ($N_2$), nitric oxide (NO)<carbon monoxide (CO), carbon dioxide ($CO_2$), sulfur dioxide ($SO_2$, water vapor ($H_2$ cadmium (Cd), selenium (Se), zinc (An), chlorides, and perhaps others, collect above the molten liquids. Some particulates (finely divided particles) will also be present in the gases.

Additional oxygen is introduced into the gases at or near the furnace discharge. This serves to further complete the oxidation of the CO into $CO_2$, and also serves to oxidize the $SO_2$ into $SO_3$ which is then easily converted by water vapor into $H_2SO_4$ (sulfuric acid) vapor. The presence of NO serves to catalyze this reaction.

The gases then pass into a jacketed inclined heat exchanger, wherein much of the heat resulting from combustion is absorbed by circulating water and converted to high pressure steam in convetional manner. The high pressure steam is conducted to a turbine for use in generating electricity.

As the moving gases cool down to approximately 1500° F., some of them, such as zinc and variuos salts, e.g. chlorides, liquefy and are discharged into a reservoir, from which they are subsequently removed for recovery.

The remaining gases pass into a second heat exchanger similar to the first, except that the coolant water is converted to low pressure steam. The low pressure steam is used for such purposes as preheating incoming fuel and gases and space heating. Some of it is conducted to the furnace for use as a temperature controlling agent, as described previously.

As the gases further cool down to approximately 900° F., more of them liquefy, e.g. arsenic disulfide, and those gases containing cadmium or selenium values. In addition, the arsenic will solidify. These products are discharged into a reservoir, from whence they are removed, separated, and recovered.

At this point, steam and oxygen are introduced into the gas steam. The oxygen serves to convert the NO into $NO_2$ as the gases continue their journey. The oxygen also serves to convert more of the $SO_2$ into $SO_3$ whence it then combines with water to form $H_2LO_4$. The $NO_x$ present serves to catalyze this latter reaction. Other catalysts may also be employed, such as activated carbon, which serves to catalyze both of the above reactions and also the formation of nitric acid ($HNO_3$) and hydrochloric acid (HCl).

The gases then pass into a jacketed pipeline (designated as such in FIG. 1) and otherwise by the numeral 112, and are processed generally in accordance with the method taught in Nielson U.S. Pat. No. 4,728,341, included herein by reference. The specific products removed will vary depending on the particular combustibles utilized.

As the gases cool in the pipeline to a temperature of approximately 600° F., the sulfuric acid liquefies and is removed and recovered. Mercury, if present, will also be removed at this stage of the process.

As the gases continue further down the pipeline, condensates are recovered, such as water ($H_2O$) at 212° F., nitric acid ($HNO_3$) at 187° F., nitrogen dioxide ($NO_2$) at 70° F., any remaining sulfur dioxide ($SO_2$) at 14° F., solid carbon dioxide ($CO_2$) at −110° F., hydrochloric acid (HCl) at −118° F., any residual nitric oxide (NO) at −240° F., liquid oxygen ($O_2$) at −298° F., and liquid nitrogen ($N_2$) at −320° F.

The solid carbon dioxide is removed in a gravity settlement chamber 113 in accordance with the teachings of the aforesaid U.S. Pat. No. 4,728,341, from whence it is recovered. The gas enters settlement chamber 113 through a pinch valve 114 which reduces the pressure to approximately atmospheric. This in turn causes a sudden temperature drop sufficient to freeze the $CO_2$ to solid form. The remaining effluent gas is then pressurized by a pump 115 and passed through the remaining portion of pipeline 112. As a safety precaution, check valves 116 and 117 opening to the atmosphere, are employed in conjunction with gravity settlement chamber 113 to assure that the pressure is maintained near atmospheric. Virtually all particulates larger than 5—10 microns will be captured by and precipitated with the $CO_2$ in the gravity settlement chamber. If desired, the particulates may be removed from the $CO_2$ by vaporizing the $CO_2$ with pressure, or heat, or both, and removing the $CO_2$ vapor from the upper regions of the chamber. The particulates may then be periodically removed from the bottom of the chamber.

By the time the gas stream reaches the end of the pipeline, there will be essentially nothing left to discharge into the atmosphere, except for some particulates smaller than 5-10 microns in size. A particulate filter 118, such as an electrostatic precipitator, is used to remove these, and the pipeline is opened to the atmosphere through a check valve 119.

At least some of the liquid oxygen and the liquid nitrogen are preferably utilized to provide refrigerant for cooling the pipeline, as described in U.S. Pat. No. 4,728,341. This refrigerant is normally augmented by liquid oxygen and liquid nitrogen produced by a liquid air machine, as indicated in FIG. 1. A shown in FIG. 2, pipeline 112 includes a pipe 120 carrying the effluent gas and a pipe 121 carrying the cold oxygen ($O_2$) both enclosed inside the larger pipe line 112. The remaining space is filled with the cold nitrogen ($N_2$). Although the oxygen and the nitrogen start out in the liquid state, they change to the gaseous state as they progress up the pipeline and absorb heat. The oxygen and the nitrogen are both discharged at the ends of their corresponding pipes, which are at or near the inlet end to the effluent gas pipe. The oxygen is recirculated to provide at least a part of the oxygen needed in earlier phases of the process as described above.

The nitrogen may contain particulates, depending on the combusible burned in the furnace. As shown in FIG. 1, a particulate filter, preferably a cyclone 122 with a pump 123, is incorporated in the liquid nitrogen discharge pipe, prior to introduction of the nitrogen into the pipeline. In addition, after discharge from the pipeline, the nitrogen is passed through a particulate filter 124, such as an electrostatic preciritator, to remove any remaining particulates that may still reside in the nitrogen gas stream. The nitrogen is then vented to the atmosphere through a check valve 125, or may be recovered for other use. Nitrogen is not, of course, considered to be a pollutant since air is normally 80% nitrogen.

As a variant in the process, a conventional liquid air machine 126 may be used instead of the liquid-hydrogen-cooled pipeline 112 following the gravity settlement chamber. This liquefy and separate the oxygen and nitrogen which can then be utilized as described above. One possible problem, however, is that any residual nitrogen oxides ($NO_x$) that are present will mix with the nitrogen that is eventually discharged into the atmosphere. This may or may not be of such quantity as to be considered polluting, depending on the efficiency of the earlier parts of the process in converting NO to $NO_2$ and removing the $NO_2$. If found to be polluting, this variant cannot be used.

In carrying out the method, apparatus is utilized as shown in FIGS. 2-7.

Figure 3:
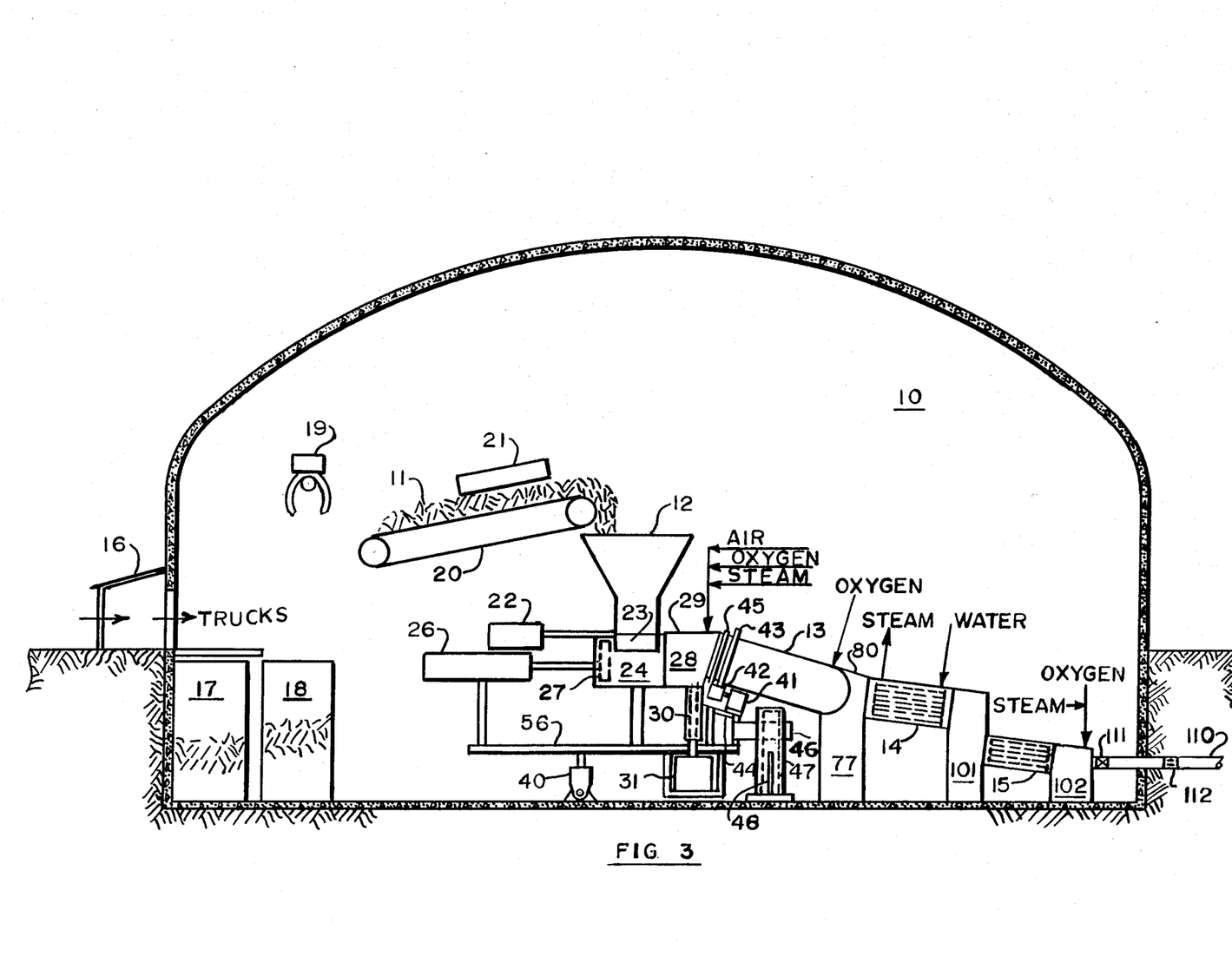
FIG. 3, a schematic representation of apparatus, showing a combustible feed, a furnace, and heat exchangers for carrying out the method or process.

Referring to FIG. 3, a large dome-shaped enclosure 10 encompasses a fuel feed system 11, a hopper 12, a furnace 13, a first heat exchanger 14, a second heat exchanger 15, and associated equipment and facilities. Coal and garbage are brought into the enclosure by means of trucks through an airlock 16. The enclosure, and associated air lock, prevent gases and pollutants from the garbage and coal from polluting the atmosphere as they are dumped from the trucks. Normally, the pressure in the enclosure 10 will be maintained at a slightly lower value than the outside atmosphere.

The coal and garbage (hereafter called the combustibles) are dumped into separate containers 17 and 18. From here they are picked up by traveling crane 19, and dumped onto an endless conveyor belt 20 in the desired ratio. An electromagnet 21 removes iron and steel items from the combustible, which items are then removed and transferred to a collection point by ordinary means, not described here. Optionally, a magnetic heat belt pulley may be employed.

Figure 4:
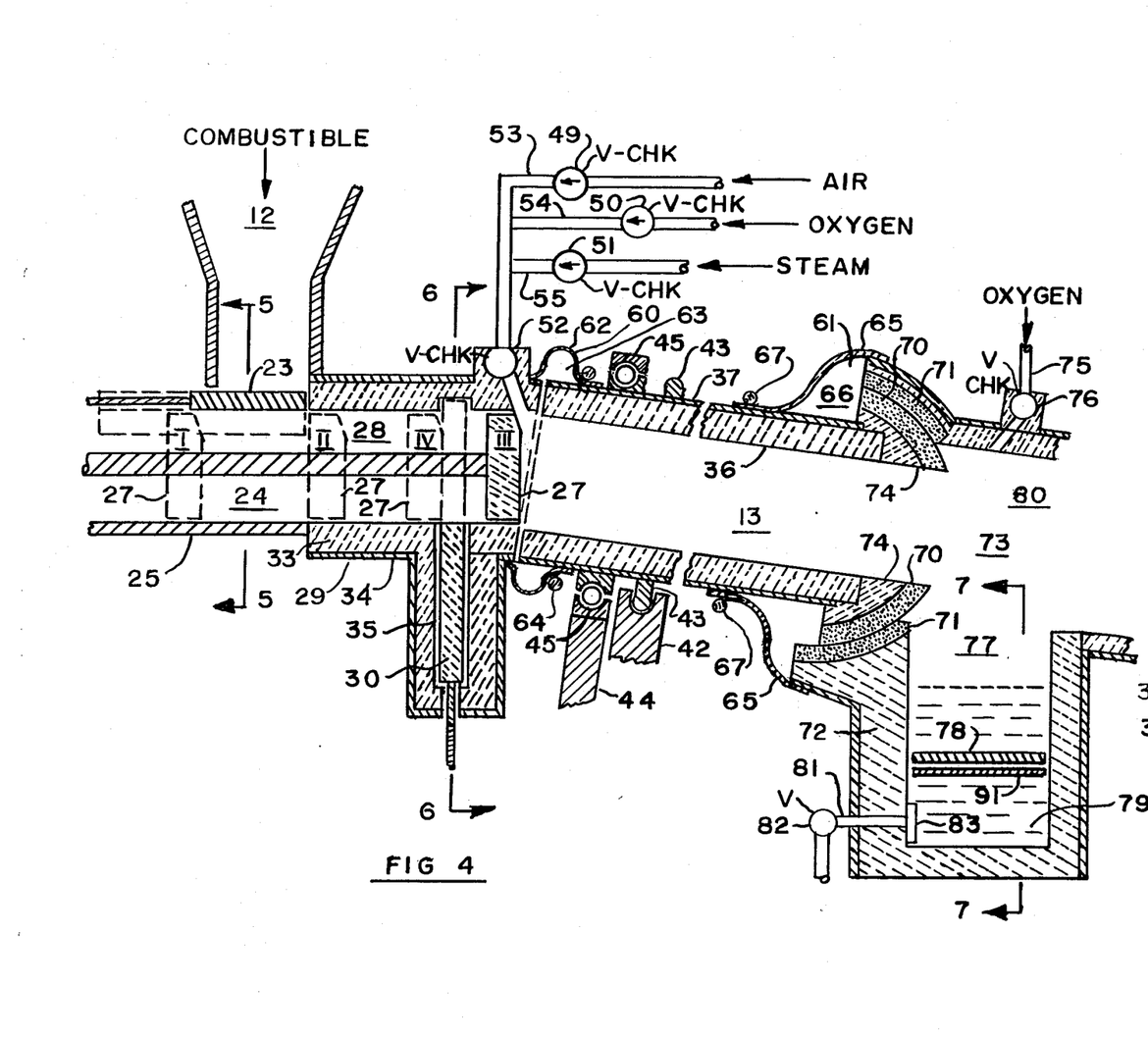
FIG. 4, an axial vertical section taken longitudinally through the combustible feed, furnace, and a first recovery (separation-collection) chamber of the apparatus of FIG. 3.

Combustibles are then dumped into the hopper 12, as illustrated in FIGS. 3 and 4. When a prescribed amount has been dumped into the hopper 12, a hydraulic cylinder 22 then pulls the slidable bottom 23 of the bottom of the hopper 12 to an open position, thus allowing the combustible to fall into a first compartment 24 inside a cylinder 25. (As an option, a ram may be used to assist in transferring the combustible from the hopper 12 and in compacting it in compartment 24.) Hydraulic cylinder 22 then reverses and pushes the slidable bottom 23 back into a closed position. A hydraulic cylinder 26 then pushes piston 27 inside cylinder 25 from position I, FIG. 4, to position II, thus pushing the combustible into a second compartment 28 inside cylinder 29. The combustible will now be compressed into a space defined by piston 27 in position II, a gate 30 (described below) in its closed position, and the walls of cylinder 29.

Hydraulic cylinder 31 then pulls gate 30, as shown in FIGS. 3 and 4, downward and into an open position.

Hydraulic cylinder 26 then pushes piston 27 into position III which pushes the combustible into the open end of furnace 13, at which point hydraulic cylinder 26 reverses and retracts piston 27 to position IV.

Figure 5:
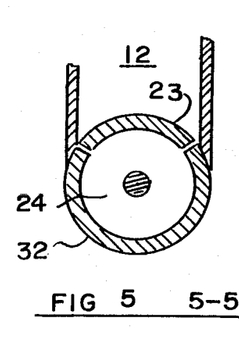
FIG. 5, a transverse vertical section taken on the line 5—5 of FIG. 4.
Figure 6:
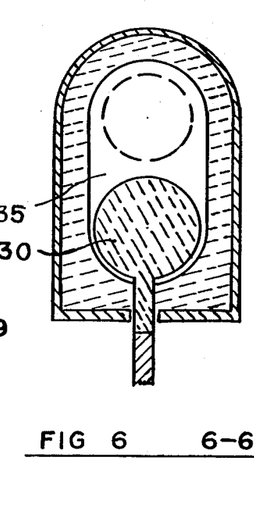
FIG. 6, a similar section taken on the line 6—6 of FIG. 4.

As shown in FIGS. 5 and 6, compartments 24 and 28 are cylindrical in shape and slidable bottom 23 of hopper 12 is arcuate. The cylindrical wall 32 of compartment 24, and the bottom 23 of hopper 12, may be made of metal or brick. The cylinder wall 33 of compartment 28 is made of a refractory material such as periclase ($M_gO$) or corundum ($Al_2O_3$) brick, surrounded externally by a metal shell 34.

Piston 27 is also made of a similar refractory material.

As shown in FIG. 6, gate 30 is likewise made of a refractory material. Gate 30 slides in a close fitting picket 35 which protrudes from the cylinder 29 as shown in FIGS. 4 and 6. When gate 30 is pushed upwards by hydraulic cylinder 31, it serves to seal off furnace 13 from compartment 28. GAte 30 will normally remain in this position at all times except when piston 27 is in position II, or position III, or points in between. At the point in the cycle where piston 27 is in position II, and ready to push the combustible into the furnace, gate 30 is opened by being retracted downward into pocket 35, piston 27 moves into position III an then back into position IV, and gate 30 is again closed. Piston 27 is then retracted to position I.

Piston 27 fits very closely inside cylinder 29, and in position IV is very closes to gate 30 when gate 30 is closed. Thus, virtually no hot gas can escape from furnace 13 into compartments 28 or 24.

As a safety precaution, piston 27 and gate 30 are both mechanically, or hydraulically, and electrically interlocked so that gate 30 can never be opened unless piston 27 is in position II, and must be closed before piston 27 can be retracted from position IV to position I.

Furnace 13 is a cylinder, having a refractory wall 36 and a metal shell 37, with its longitudinal axis downwardly inclined somewhat from the horizontal. The angel of inclination is adjustable being controlled by hydraulic cylinder 40. As depicted in FIGS. 3 and 4, hydraulic cylinder 40 is positioned so as to raise or lower the input end of the furnace 13, and all associated equipment, pivoting as necessary on spherical bearings 70 and 71.

The speed of rotation of the cylindrical furnace 13 is controlled by variable speed motor 41 which drives a dished wheel 42 which in turn rides on a rail 43 circumscribing and attached to the perimeter of furnace 13, thus causing furnace 13 to rotate. Thus, as the furnace 13 rotates, the combustible is advanced down the incline from the input end to the discharge end. The speed of rotation and the degree of incline can be adjusted to optimize the burning time for the combustible being utilized.

Motor 41 is mounted on a platform 44, which is supported on platform 56, which is attached to the piston rod of hydraulic cylinder 40. Platform 44 also has an extension which bears against furnace 13, through a bearing 45, in a conventional manner. Thus, hydraulic cylinder 40 can raise or lower the input end of furnace 13, the rotating drive means, the fuel feed system, and associated equipment. Hydraulic cylinder 40 is so arranged as to allow the slope of furnace 13 to be adjusted from approximately 10 degrees to 30 degrees. A torque arm is also provided, for stability, which comprises a solid metal plate 46 attached to the support for platform 44, and which slides in a vertical direction between two vertical channels 47, having their flat faces facing each other and spaced far enough apart to accept sliding plate 46. Each channel is stabilized by a gusset such as 48.

As depicted in FIGS. 3 and 4, air, oxygen, and stem are introduced into the input end of furnace 13, through check valves 49, 50, 51, and 52. The check valves assure that no gases flow backwards and also that no hot gases from the furnace enter the supply lines from the air, oxygen,a nd steam.

Means for introducing air into the furnace comprise conduit 53, valve 49, and any suitable compressor (not shown) which compresses air from inside the dome 10. to a value greater than the internal pressure in furnace 13, which is typically one to four atmospheres. Air may enter dome 10 through airlock 16. The pressure inside dome 10 is maintained, by ordinary means, at a value slightly lower than the external atmospheric pressure so that no pollutant gases that may be inside the dome can vent to the outside atmosphere.

Means for supplying oxygen to the furnace comprise conduit 54, valve 50, a compressor (not shown), and a source of oxygen (not shown). The oxygen is mixed with the air in a ratio suitable for the particular combustible being burned.

Means for supplying steam to the furnace comprise conduit 55, valve 51, a compressor if needed, and a source of steam (not shown). The steam is supplied as needed to assist in controlling the temperature in the furnace so as not to be too hot.

Means for sealing the furnace against the atmosphere inside the dome comprise seal 60 at the input end of the furnace and seal 61 at the discharge end of the furnace. Seal 60 comprises a resilient folded strip of metal 62, a chamber 63, and a metal O-ring 64. Strip 62 is attached to metal shell 34 at one edge. The opposite edge is pressed firmly against furnace shell 37 by O-ring 64. Chamber 63 is filled with crude oil under a pressure greater than the internal furnace pressure. Thus, any leakage that might occur would result in release of oil into the furnace, and not venting of gases from the furnace into the dome.

Seal 61 is similarly constructed having a resilient strip 65, a chamber 66, and an O-ring 67. Chamber 66 is filled with oil under pressure.

The discharge end of the furnace 13 is supported by spherical ceramic bearing 70 which bears against its cooperating ceramic bearing 71. The bearing surfaces of bearings 70 and 71 are closely matched and polished so as to provide a smooth sliding surface to accommodate both tilting and rotation of furnace 13. The bearing is lubricated by oil from inside seal 61.

Ceramic bearing 71 is supported by a wall 72 of separation-collection chamber 73. Bearing 70 is supported on firebrick 74 which abuts and is securely cemented to firebrick 36. Metallic sheath 37 is also recessed at its end into firebrick 74. Ceramic bearing 71 is abutted against and cemented to chamber wall 72 which is also firebrick. Any gases that might tent to escape between the bearing surfaces are prevented from escaping into the dome by the seal 61.

The combustion temperature inside the furnace is maintained at a temperature suitable for the combustible being burned. Typically this would be in the order of 2,100°F. for garbage and coal. The temperature is controlled by the rate of introduction of combustible, air, oxygen, and steam introduced into the furnace, and also by the burn time and the turbulence. As noted above, the air, oxygen and steam are introduced by way of conduits 53, 54, and 55 at the input end of the furnace. In addition, a conduit 75 supplies oxygen at the discharge end of the furnace. This conduit penetrates a wall of chamber 73, as shown in FIG. 4, by way of a check valve 76.

Separation-collection chamber 73 (see FIGS. 4 and 7) comprises a vertically disposed tank 77; an endless magnesium oxide drag conveyor 78 positioned inclinedly in the tank onto which solid particles discharged from the furnace, such as heavy slag, magnesium oxide, calcium oxide, aluminum oxide, tungsten compounds, steel, and others, fall; means (see FIG. 7) for moving the drag conveyor inclinedly upwards and out of the tank and removing the particles therefrom; a reservoir space 79 into which liquids such as molten lead, copper, tin, aluminum, glass, light slag, and others accumulate; a space 80 above the surface of the liquid wherein combustion gases discharged from the furnace accumulate; and one or more magnesium oxide discharge conduits, such as 81, each of which has a valve 82, controlling the flow therein. At least one of the discharge conduits 81 has a movable spout (not shown) which may be positioned so as to discharge into one of a series of selected receptacles, depending on the particular liquid being discharged. As can be readily appreciated, the liquids in tank 77 will be substantially stratified with the heaviest liquid near the bottom and the lighter liquids progressively higher, depending on their specific gravity. Thus a natural and substantial separation takes place in the tank which separation may be used to advantage as the liquids are progressively discharged from the tank. A magnesium oxide bar screen 83 is placed at the input to each conduit 82 so as to prevent solids from entering the conduit.

As an option, a ceramic float (not shown) may be employed which rides on the surface of the liquid and by means of a rod operates limit switches, which in turn control valves 82.

As an option, each of the conduits 81 may be electrically heated, by heating coils, and insulated in order to prevent the liquids from cooling and solidifying in the conduits.

Figure 7:
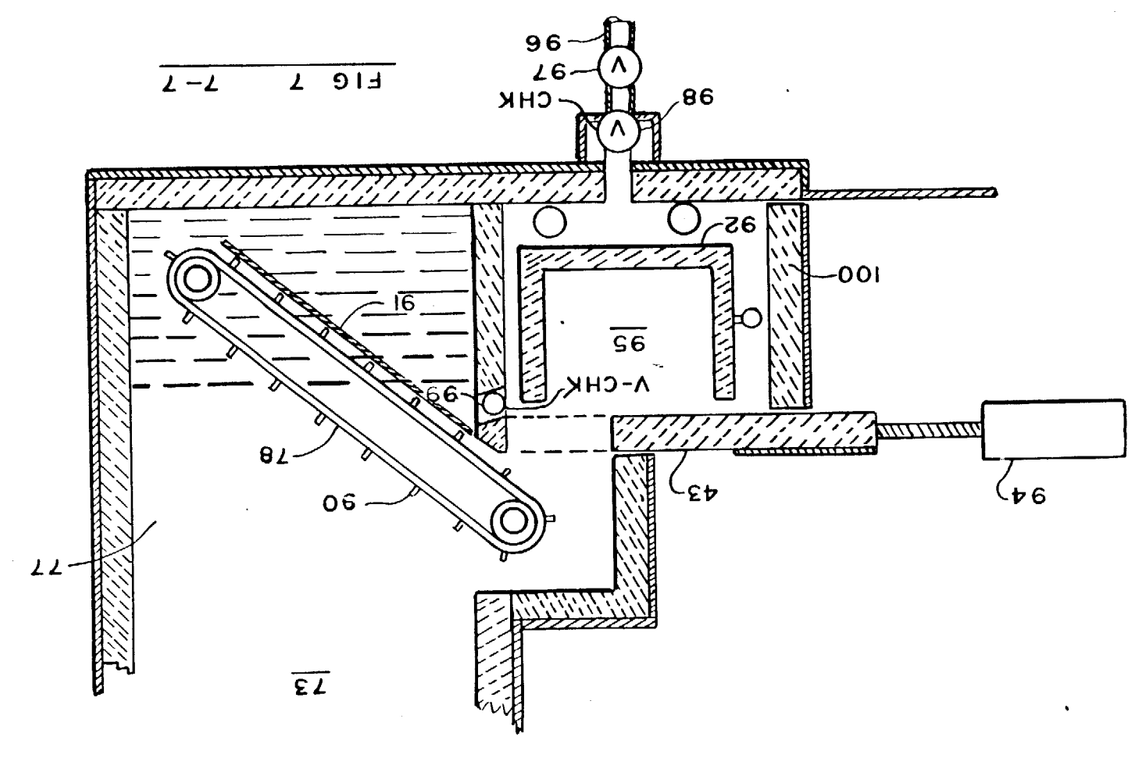
FIG. 7, a similar section taken on the line 7—7 of FIG. 4, showing apparatus for removing solids discharged from the furnace.

As noted above, the solid items are removed from tank 77 by means of an inclined magnesium oxide drag conveyor 78 (see FIG. 7). Drag conveyor 78 is of a chain line construction having upwardly extending projections 90 which assist in carrying the solid items up and out of the tank. A sloping ceramic plate 91, located just below, and in contact with, the drag conveyor 78, catches small items, from whence they are then carried up and out of the tank by the drag conveyor.

As the items reach the top of the drag conveyor position, they are dumped into a removable vessel 92 in chamber 95 as shown in FIG. 7. When vessel 92 is substantially full, the drag conveyor is stopped and gate 93 is closed by means of hydraulic cylinder 94. At this time, air, or alternatively nitrogen, is introduced into chamber 95 under pressure by way of conduit 96, valve 97, and check valve 98. This will serve to pure the gases from chamber 94 through check valve 99 into chamber 73. Following the purging, gate 100 is opened by means of another hydraulic cylinder (not shown). Vessel 92 is then pulled out of chamber 95, and the items therein are removed and recovered. Vessel 92 is then pushed back into place in chamber 95, gate 100 is closed, gate 92 is opened, and drag conveyor 78 restarted to start another cycle.

A indicated in FIG. 7, the walls and floor of chamber 95, gate 93, gate 100, and vessel 92 are all made of refractory material.

The hot gases in space 80 (see FIG. 3), being subjected to the same pressure as exists in furnace 13, will be forced into longitudinal ceramic boiler tubes in boiler 14, which is inclined. The boiler tubes are surrounded by water, which absorbs heat from the gases and turns to steam, all in a conventional manner. The steam exits as high pressure steam through a conduit (not shown) by means of which it may be conducted to a steam turbine (not shown) for generating electricity. As the gases traverse downwardly through the boiler tubes, they will cool, thus causing some of them to condense. The condensed gases, which typically will comprise zinc, chlorides, volatilized salts and perhaps others, will flow into tank 101, which is insulated with fire brick and encompassed by a metal shell. The temperature inside tank 101 is maintained at approximately 1,500° F. This is controlled by the rate of flow of the water through the boiler. A discharge conduit is located at the bottom of the tank and has a valve therein through which the liquids are discharged for recovery. As an option, a float (not shown) may be employed for riding on the surface of the liquid. Such float has a rod (not shown) extending vertically therefrom. Such rod operates limit switches (not shown), which, in turn, send electrical signals to open or close a valve (not shown), all in the manner as previously described for the float (not shown) in tank 77.

The gases which were not liquefied then enter ceramic boiler tubes in a second boiler 15, which tubes are also surrounded by water which turns to steam as the water absorbs heat from the gases. This steam will naturally be at a lower pressure than the steam generated in boiler 14, since the temperature in boiler 15 will be lower than that in boiler 14. This lower pressure steam is discharged through a conduit (not shown) for external use. Boiler 15 is insulated with firebrick and encompasses by a metal shell.

Gases which are liquefied in boiler 15, such as cadmium, lithium, and arsenic, flow into tank 102, from whence they are then removed by means of a conduit (not shown) and a valve (not shown) at the bottom of tank 102. As an option, a float and limit switch may be employed as previously discussed for tank 101. The temperature inside tank 102 is maintained at approximately 900° F. This is controlled by the rate of flow of the water through the boiler.

It is not anticipated that salt crystals, or other materials, will accumulate inside the boiler tubes. However, if they should, the tubes can be intermittently reamed out by means of a hollow, revolving, ceramic tube having a carbide cutting tip in a manner well known in the industry. Water of flame fed through the hollow tubes can be employed, if necessary, to assist in this cleaning process.

The effluent gases are discharged from boiler 15 into pipeline 110 through check valve 111 and into apparatus designed and constructed to treat hydrocarbon gases containing carbon dioxide and potential atmospheric pollutants as described in the aforementioned U.S. Pat. No. 4,728,341. The effluent gases are introduced into the input of stage 38, as described in the patent and as shown in FIG. 7 of the paten, and are treated generally thereafter as described in the patent.

Preferably a honeycomb-like chamber 112, fashioned from or lined with activated carbon, is incorporated near the input end of pipeline 110, through which the gases pass. The catalyzes reactions to form $NO_2$, $H_2SO_4$, $HNO_3$, and $HCl$. As can be readily seen, substantially all polluting products of combustion will be removed by the time the effluent gases reach the discharge end of the pipeline, leaving very little to be vented into the atmosphere. The only gases to be vented into the atmosphere will be nitrogen, trace amounts of argon, and perhaps some other gases in trace amounts too small to be considered pollutants.

Whereas this invention is here illustrated and described with specific reference to an embodiment thereof presently contemplates as the best mode of carrying out such invention in actual practice, it is to be understood that various changes may be made in adapting the invention to different embodiments without departing from the broader inventive concepts disclosed herein and comprehended by the claims that follow.

I claim:

1. A method of burning solid combustibles containing potential atmospheric pollutants and of recovering valuable resources from said combustibles while preventing the release of pollutants into the atmosphere, comprising the steps of introducing said combustibles through an airlock into a furnace substantially sealed against the atmosphere; introducing combustion-supporting fluid into the furnace; burning said combustibles at a temperature high enough to melt at least some of the inorganic components contained therein; removing and recovering solid components from said furnace through a gas lock; removing and recovering molten components from said furnace through a conduit and valve; passing high temperature gaseous products of combustion from said furnace through heat exchanger means utilizing boiler tubes carrying the gaseous products surrounded by water to generate steam as a useful product; removing and recovering liquid condensates from the boiler tubes as the gases cool; introducing effluent gases from the boiler tubes into a pipeline; progressively removing heat from said effluent gases as they flow along said pipeline by passing coolant fluid along respective longitudinal portions of said pipeline in heat exchange relationship therewith; refrigerating at least a portion of said coolant fluid so that the extend of heat removal along certain of said portions is such as to change the state of various potential atmospheric pollutants and other constituents from the gaseous to the liquid or solid phase; and separating and recovering said pollutants and other constituents in their liquid or solid form from the residual gas substantially at said respective portions of said pipeline.

2. A method in accordance with claim 1, wherein oxygen is introduced at one or more steps in excess of that needed for stoichiometric combustion is augment the method of burning combustibles and recovering valuable resources.

3. A method in accordance with claim 1, wherein water is introduced at one or more steps to augment the method of burning combustibles and recovering valuable resources.

4. A method in accordance in claim 1, wherein activated carbon is incorporated in one or more steps to serve as a catalyst.

5. Apparatus for burning a combustible, and recovering resources therefrom, comprising a furnace substantially sealed to the atmosphere; means for feeding the combustible to the furnace through a gas-sealing means; means for introducing combustion supporting fluid into the furnace; means for separately removing, from the furnace, the solid, liquid, and gaseous products resulting after combustion without venting unwanted pollutants to the atmosphere; heat exchanger means for removing heat from said gaseous products; means for changing the state of certain of the constituents of said gaseous products; and means for separately removing said contituents in their changed state without venting unwanted pollutants into the atmosphere.

6. Apparatus in accordance with claim 5, wherein the combustion supporting fluid comprises oxygen and air.

7. Apparatus in accordance with claim 5, wherein at least one of the constituents removed from the gaseous products is recirculated to supply at least a portion of the needs of said constituent utilized to augment the method of burning combustibles and recovering resources.

8. Apparatus in accordance with claim 5, having an external structure which surrounds at least the furnace and the means for feeding the combustible to the furnace, which structure is substantially sealed to the atmosphere and into which the combustible and air are introduced through an air lock.

9. Apparatus in accordance with claim 5, wherein the means for feeding the combustible to the furnace comprises an endless belt for carrying the combustible to a hopper; a hopper into which the combustible is introduced; and gas-sealing discharge means for discharging the combustible from the hopper and into the furnace.

10. Apparatus in accordance with claim 9, wherein one or more magnets are positioned near the conveyor belt for removing iron, steel, and other magnetic items from the combustible.

11. Apparatus in accordance in claim 9, wherein the hopper has a bottom adapted to be opened and closed and the gas-sealing discharge means comprises a series of compartments; means for opening the bottom of the hopper thus allowing the combustible to fall into a first of said compartments; means for closing the bottom of the hopper; means for transferring the combustible from the first compartment into a second compartment, said second compartment having an end adapted to be opened and closed; means for opening said end of said second compartment after the combustible has been transferred into said second compartment; means for transferring the combustible from the second compartment into the furnace; means for restoring each of said means of their initial positions for the start of a new cycle; and means for preventing the release of unwanted pollutants into the atmosphere.

12. Apparatus in accordance with claim 11, having means for forcing the combustible from the hopper into the first of said compartments and for compacting it therein.

13. Apparatus in accordance with claim 5, wherein the furnace comprises an inclined cylindrical structure having a longitudinal axis inclined downwardly from the input end to the discharge end; means for rotating the cylindrical structure about its longitudinal axis; and means for introducing the combustion supporting fluid into the cylindrical structure at one or more points along the length of the cylindrical structure.

14. Apparatus in accordance with claim 13, having means for adjusting the incline of the cylindrical structure.

15. Apparatus in accordance with claim 13, having means for adjusting the speed of rotation of the cylindrical structure.

16. Apparatus in accordance with claim 13, wherein seals are provided at each end of the furnace bridging the space between the stationary and moving parts, one or more of which contain fluid under pressure thus preventing the escape of gases into the atmosphere.

17. Apparatus in accordance with claim 16, wherein the fluid is a lubricant which lubricates the interface between moving and stationary parts.

18. Apparatus in accordance with claim 13, wherein the lower end to the cylindrical structure is supported by a bearing, to accommodate rotation and change of incline, and wherein the bearing comprises two mating ceramic members, spherical in shape, and having their mating surface accurately configured and polished so as to slide smoothly and easily against each other, with substantially not space between them.

19. Apparatus in accordance with claim 5, including a vertically disposed separation-collection chamber at the discharge end of the furnace; an endless drag conveyor at the bottom of said chamber onto which the solid items discharging from the furnace fall; a reservoir above the lower portion of said drag conveyor within which the liquids dischargeing from the furnace accumulate; a region near the top of the chamber within which hot gases discharging from the furnace accumulate; means for moving the endless drag conveyor inclinedly up and out of the chamber so a s to carry the solid items out of the chamber; means for discharging the solid items from the drag conveyor and recovering them without venting unwanted pollutants into the atmosphere; means for removing the liquids form the chamber; and means for introducing the hot gases into a downwardly inclined heat exchanger.

20. Apparatus in accordance with claim 19, wherein the means for removing the solid items from the chamber comprises a gas lock, having a compartment substantially sealed to the atmosphere; item receiving means inside said compartment for receiving solid items discharged from the drag conveyor; means for sealing said compartment from the chamber, after said item receiving means has received items, so as to substantially prevent gases from the chamber from entering said compartment; means for purging polluting gases from said compartment by introducing air or nitrogen into said compartment under sufficient pressure to force said polluting gases back into the chamber; means for opening said compartment and removing the item receiving means therefrom after the polluting gases have been purged from said compartment; and means for restoring the item receiving means to said compartment and resealing said compartment to the atmosphere after the solid items have been recovered from the item receiving means.

21. Apparatus in accordance in claim 19, having means for selectively removing the liquids, depending on their specific gravity, from the chamber, which means comprises one or more devices each of which has discharge conduit, a valve, and a spout, at least one of which can be translated so as to discharge into successive containers.

22. Apparatus in accordance with claim 5, wherein the heat exchanger means comprises one or more downwardly inclined boilers; longitudinal boiler tubes inside the boilers through which the hot gases pass; water inside the boilers surrounding the boiler through which the hot gases pass; water inside the boilers surrounding the boiler tubes which vaporizes to steam as it absorbs heat; one or more exit conduits through which the steam is conducted away from the boilers; a reservoir near the downstream end of each boiler that collects liquefied gases as they drain from the boiler tubes; and a discharge means at the discharge end of each boiler into which the remaining effluent gases in the boiler tubes are discharged.

23. Apparatus in accordance with claim 22, having means for maintaining the temperature in one of the reservoirs at approximately 1,500° F.

24. Apparatus in accordance with claim 22, having means for maintaining the temperature in one of the reservoirs at approximately 900° F.

25. Apparatus in accordance with claim 22, having means for treating the effluent gases, which may contain carbon dioxide and potential atmospheric pollutants, connected to tandem to the discharge end of the boiler tubes, said means being constructed and arranged to treat the effluent gases in sequential cooling.

26. Apparatus in accordance with claim 5, having means for introducing water into the furnace.

27. Apparatus in accordance with claim 5, having means for introducing oxygen into the gases at or near the discharge end of the furnace.

28. Apparatus in accordance with claim 25, having means for introducing oxygen into the effluent gases at or near the discharge ends of the boiler tubes.

29. Apparatus in accordance with claim 25, having means for introducing water into the effluent gases at or near the discharge ends of the boiler tubes.

30. Apparatus in accordance with claim 25, wherein means are provided for utilizing liquefied oxygen discharge from the effluent gases to provide at least some of the cooling of the effluent gases.

31. Apparatus in accordance in claim 25, wherein means are provided for utilizing liquefied nitrogen discharged from the effluent gases to provide at least some of the cooling of the effluent gases.

32. Apparatus in accordance with claim 25, where in the means for treating the effluent gases includes a pipeline having three separated internal compartments, one of which carries the effluent gases, another of which carries oxygen, and another of which carries nitrogen, all in heat exchange relationship with each other.

33. Apparatus in accordance with claim 25, including means providing activated carbon as a catalyst to aid in the formation of $No_3$, $H_2SO_4$, $HNO_3$ and $HCl$.

34. Apparatus for burning solid combustibles containing potential atmospheric pollutants and recovering therefrom valuable resources, comprising a furnace having means by which the parameters of time, temperature, and turbulence are each controlled; sealing means for preventing discharge of pollutants from aid furnace into the atmosphere; means for separately discharging solid, molten, and gaseous products from aid furnace; means for separating and recovering solid products discharged from the furnace; means for separating and recovering molten products discharged from the furnace; means for recovering heat energy from said furnace-produced products; means for effecting chemical reaction of effluent gases discharged from the furnace, thus producing desired products; means for introducing catalytic agents into effluent gases discharged from the furnace, thus augmenting the chemical reactions; means for changing the state of effluent gases discharged from the furnace and also gases resulting from said chemical reactions; and means for separating and recovering different gases in their changed states.

* * * * *

UNITED STATES PATENT AND TRADEMARK OFFICE
CERTIFICATE OF CORRECTION

PATENT NO.  : 4,829,911

DATED       : May 16, 1989

INVENTOR(S) : Jay P. Nielson

It is certified that error appears in the above-identified patent and that said Letters Patent is hereby corrected as shown below:

Drawings: Add Fig. 7 which was inadvertently omitted, as shown on the attached sheet.

Column 1, line 42, change "n" to --On--; line 59, change "of" to --in--.

Column 2, line 46, change "A" to --As--; line 48, change "A" to --As--.

Column 3, line 65, change "<" to a comma; line 66, change "H2" to --$H_2O$--; line 67, change "(An)," to --(Zn),--.

Column 4, line 12, change "convetional" to --conventional--; line 16, change "variuos" to --various--; line 34, change "steam" to --stream--; line 37, change "$H_2LO_4$" to --$H_sSO_4$--.

Column 5, line 56, after "This" insert --will--.

Column 6, line 17, change "heat" to --head--; line 54, change "picket" to --pocket--.

Column 7, line 43, change "stem" to --steam--.

Column 8, line 29, change "tent" to --tend--.

Column 9, line 32, change "pure" to --purge--; line 38, change "92" to --93--.

Column 10, line 11 into 12, change "encom-passes" to --encompassed--; line 27, change "of" to --or--; line 36, change "paten," to --patent,--; line 41, change "The" to --This--; line 52, change "contemplates" to --contemplated--.

UNITED STATES PATENT AND TRADEMARK OFFICE
CERTIFICATE OF CORRECTION

PATENT NO. : 4,829,911

DATED : May 16, 1989

INVENTOR(S) : Jay P. Nielson

It is certified that error appears in the above-identified patent and that said Letters Patent is hereby corrected as shown below:

Column 11, line 16, change "extend" to --extent--; line 26, change "is" to --to--.

Column 12, line 21, change "of" to --to--; line 51, change "to" to --of--; line 57, change "not" to --no--; line 64, change "dischargeing" to --discharging--.

Column 13, line 4, change "form" to --from--.

Column 14, line 17 into 18, change "dis-charge" to --discharged--; line 39, change "aid" to --said--; line 41, change "aid" to --said--.

Signed and Sealed this

Sixteenth Day of January, 1990

Attest:

JEFFREY M. SAMUELS

*Attesting Officer*   *Acting Commissioner of Patents and Trademarks*

FIG 7   7-7